(12) United States Patent
Ward et al.

(10) Patent No.: US 7,675,912 B1
(45) Date of Patent: Mar. 9, 2010

(54) METHOD AND APPARATUS FOR BORDER GATEWAY PROTOCOL (BGP) AUTO DISCOVERY

(75) Inventors: David D. Ward, Somerset, WI (US); Robert Raszuk, Komorow (PL); Keyur Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 885 days.

(21) Appl. No.: 11/175,461

(22) Filed: Jul. 5, 2005

(51) Int. Cl.
*H04L 12/28* (2006.01)

(52) U.S. Cl. ............ 370/392; 370/400; 709/237; 709/238

(58) Field of Classification Search .......... 370/216, 370/229, 238, 242, 248, 250, 252, 254, 389, 370/396, 401, 428; 709/223, 238, 242
See application file for complete search history.

(56) References Cited

U.S. PATENT DOCUMENTS

| | | | |
|---|---|---|---|
| 6,704,795 B1* | 3/2004 | Fernando et al. ............ | 709/237 |
| 7,180,864 B2* | 2/2007 | Basu et al. .................. | 370/238 |
| 7,349,994 B2* | 3/2008 | Balonado et al. ............ | 709/250 |
| 7,406,030 B1* | 7/2008 | Rijsman ..................... | 370/216 |
| 2003/0046390 A1* | 3/2003 | Ball et al. ................... | 709/224 |
| 2003/0177221 A1* | 9/2003 | Ould-Brahim et al. ...... | 709/223 |
| 2005/0050225 A1* | 3/2005 | Tatman ...................... | 709/244 |
| 2005/0097203 A1* | 5/2005 | Unbehagen et al. ......... | 709/223 |
| 2005/0152286 A1* | 7/2005 | Betts et al. .................. | 370/255 |
| 2006/0077895 A1* | 4/2006 | Wright ....................... | 370/235 |

OTHER PUBLICATIONS

Bates, T. et al., "BGP Route Reflection An alternative to full mesh IBGP," Network Working Group, RFC 1966, Experimental, Jun. 1996, 7 pages.
Bates, T. et al., "BGP Route Reflection—An alternative to full mesh IBGP," Network Working Group, RFC 2796, Apr. 2000, 10 pages.
Bates, T. et al., "Mutliprotocol Extensions for BGP-4," RFC 2858, Standards Track, Jun. 2000, 10 pages.
Raszuk, Robert, "OSPF Extensions for BGP Peer Discovery," Network Working Group, Internet Draft, Jun. 2003, 7 pages.
Rekhter, Y. et al., "A Border Gateway Protocol 4 (BGP-4)," Network Working Group, RFC 1771, Mar. 1995, 51 pages.
Rosen, E. et al., "BGP/MPLS VPNs," Network Working Group, RFC 2547, Mar. 1999, 23 pages.
Scudder, John G. et al, "Multisession BGP," Network Working Group, Draft, May 2004, 10 pages.

* cited by examiner

*Primary Examiner*—Jayanti K Patel
*Assistant Examiner*—Jung Park
(74) *Attorney, Agent, or Firm*—Hickman Palermo Truong & Becker LLP

(57) ABSTRACT

A method is disclosed for Border Gateway Protocol (BGP) service auto discovery. A first message is received from a first BGP host. The first message comprises first information that indicates that the first BGP host provides reachability information associated with one or more route types. The first information is stored. The first information is sent in a second message to a second BGP host, where the first BGP host and the second BGP host are not conducting a BGP peering session.

32 Claims, 6 Drawing Sheets

METHOD AND APPARATUS FOR BORDER GATEWAY PROTOCOL (BGP) AUTO DISCOVERY

FIELD OF THE INVENTION

The present invention generally relates to managing network routing information. The invention relates more specifically to a method for Border Gateway Protocol (BGP) peers to automatically discover one another.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Border Gateway Protocol (BGP) is a path vector routing protocol for exchanging routing information among network elements in the same or different Autonomous System (AS). The function of a BGP-enabled network element (a BGP host or peer) is to exchange network reachability information with other BGP-enabled network elements. The most commonly implemented version of BGP is BGP-4, which is defined in RFC1771 (published by the Internet Engineering Task Force (IETF) in March 1995).

To exchange routing information, two BGP hosts first establish a BGP peering session by exchanging BGP OPEN messages. The BGP hosts then exchange their full routing tables. After this initial exchange, each BGP host sends to its BGP peer or peers only incremental updates for new, modified, and unavailable or withdrawn routes in one or more BGP UPDATE messages. A route is a unit of information that pairs a network destination with the attributes of a network path to that destination. Examples of path attributes include, but are not limited to, the ORIGIN attribute (which indicates how a BGP peer learned about a route), the AS_PATH attribute (which indicates the Autonomous Systems through which a route passes), the NEXT_HOP attribute (which is the address of the border router that is the next hop in a route), and the LOCAL_PREF attribute (which indicates the BGP peer's degree of preference of an exit point from the local AS for a route).

As defined in RFC1771, BGP-4 accommodates the exchange of only Internet Protocol version 4 (IPv4) unicast routes. The Multiprotocol Extension for BGP (MP-BGP) defined in RFC2858 (published by IETF in June 2000) accommodates the exchange of routing information for multiple Network Layer protocols, such as, for example, Internet Protocol version 6 (IPv6), Internetwork Packet eXchange (IPX), Appletalk, Banyan Vines, Asynchronous Transfer Mode (ATM), X.25, and Frame Relay.

In order to enable the exchange of multi-protocol reachability information, MP-BGP introduced two new path attributes that may be used in a BGP UPDATE message, MP_REACH_NLRI and MP_UNREACH_NLRI. The MP_REACH_NLRI path attribute provides for advertising feasible (or reachable) routes to a BGP peer, where the feasible routes are included in a Network Layer Reachability Information (NLRI) field as <length, prefix> tuples. The MP_UNREACH_NLRI path attribute provides for withdrawing multiple unfeasible (or unreachable) routes from service, where the unfeasible routes are included in a Withdrawn Routes field as <length, prefix> tuples.

FMP-BGP also introduced two single-value parameters which are included in both the MP_REACH_NLRI and MP_UNREACH_NLRI path attributes of a BGP UPDATE message: the Address Family Identifier (AFI) and the Subsequence Address Family Identifier (SAFI). The AFI parameter carries the identity of the network layer protocol associated with the network address that follows next in the path to the destination. The SAFI parameter provides additional information about the type of the Network Layer Reachability Information that is included in a BGP UPDATE message, and the values defined for this parameter usually indicate a type of communication forwarding mechanism, such as, for example, unicast or multicast. The AFI/SAFI combination is commonly used to identify a family of addresses. For example, an AFI/SAFI combination of "1/1" identifies IPv4 unicast addresses and an AFI/SAFI combination of "2/2" identifies IPv6 multicast addresses. In the context of BGP, the AFI/SAFI combination associated with a route usually indicates a type of the route's prefixes, the format the route's prefixes, and how to interpret the routes included in BGP UPDATE messages.

As networks grow more complex and the number of BGP hosts in Autonomous Systems increases, managing BGP sessions between BGP hosts in the same or different Autonomous Systems becomes more difficult. In a typical Autonomous System, it is desirable for each BGP host to exchange routing information with each other BGP host in the system in order to facilitate efficient routing of local and transit network traffic. However, to enable two BGP hosts to establish a BGP session, a user (such as a network engineer) must manually configure both BGP hosts so that the hosts can identify one another and establish a BGP peerin session. In an Internet Service Provider (ISP) autonomous system that has hundreds, sometimes even thousands of BGP hosts, it is a daunting task for a network engineer to fully mesh the BGP hosts by manually configuring BGP sessions among them.

An approach that reduces the need for manual configuration in the creation of a full BGP mesh among the internal BGP hosts of an Autonomous System is provided in a co-pending patent application Ser. No. 10/791,630, filed Mar. 1, 2004, entitled "TECHNIQUES FOR AUTOMATICALLY CREATING AN IBGP MESH," of Robert Raszuk, and assigned to the same assignee hereof. The approach described in Raszuk is suitable for exchanging IPv4 unicast routes in an Autonomous System in which a large number of internal BGP hosts need to participate in an internal BGP (iBGP) mesh, but does not fully address all issues described in this disclosure. For example, the approach described in Raszuk uses an Internal Gateway Protocol (IGP) for flooding auto-discovery information to the internal BGP hosts. The approach described herein is more suitable to be used in a network in which the BGP hosts are established on the edges of the network and in which there is not need to have any BGP state information flooded by IGP among internal BGP hosts.

Further, the approach described in Raszuk does not provide for automatically discovering BGP peers that are established on the edges of the Autonomous System and that exchange routes having a variety of route types that are maintained only by edge network elements. Examples of routes maintained only by edge network elements include, but are not limited to, Virtual Private Network (VPN) routes (as described in RFC2547, published by IETF in March 1999), Layer 3 VPN (L3VPN) routes, Layer 2 VPN (L2VPN) routes, and Multi-Protocol Label Switching (MPLS)/IP tunnel core routes.

Further, in the approach described in Raszuk, the static information used for establishing a full iBGP mesh is flooded to the internal BGP hosts over an Open Shortest Path First (OSPF) protocol, which is an Internal Gateway Protocol (IGP) that is not used to facilitate inter-AS routing information exchange. Thus, the approach in Raszuk does not address the issue of providing automatic discovery of BGP peers within External Gateway Protocols (EGP), such as, for example, BGP-4 or MP-BGP compliant protocols.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
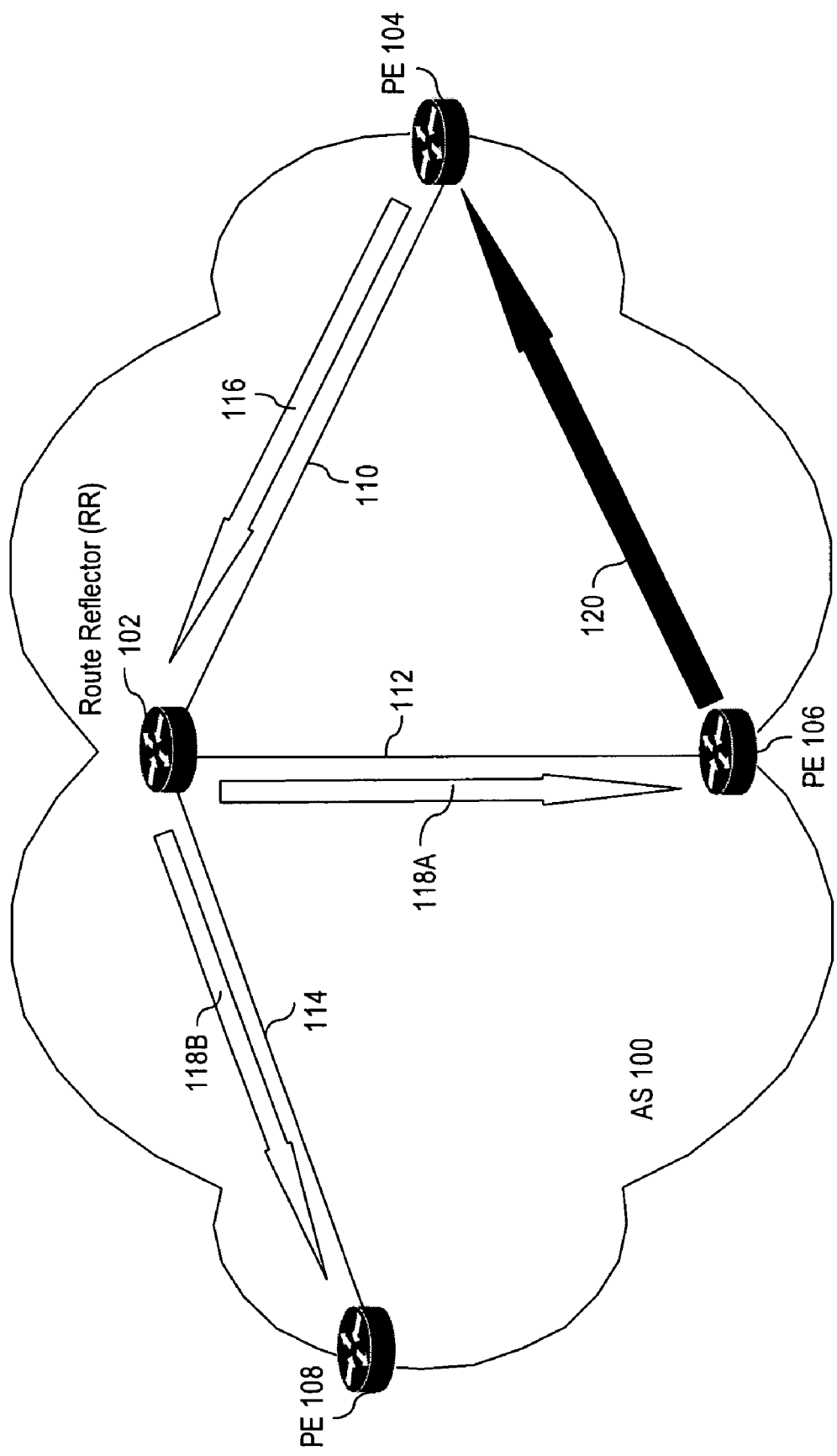
FIG. 1 is a block diagram that illustrates an overview of an example operational context in which an embodiment may be implemented.

A method and apparatus for Border Gateway Protocol (BGP) service auto discovery is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| 3.0 | Method of BGP Service Auto Discovery |
| 3.1 | BGP Auto Discovery Path Attribute |
| 3.2 | BGP Auto Discovery Peering Descriptor |
| 3.3 | BGP Auto Discovery NLRI |
| 3.4 | An Example Embodiment of a Method of BGP Auto Discovery |
| 4.0 | Implementation Mechanisms—Hardware Overview |
| 5.0 | Extensions and Alternatives |

1.0 General Overview

The needs identified in the foregoing Background, and other needs and objects that will become apparent for the following description, are achieved in the present invention, which comprises, in one aspect, a method for BGP service auto discovery. A first message is received at a network node from a first BGP host. The first message comprises first information that indicates that the first BGP host provides reachability information associated with one or more route types. The first information is stored at the network node. The first information is sent in a second message from the network node to a second BGP host, where the first BGP host and the second BGP host are not conducting a BGP peering session.

In a feature of this aspect, the first information comprises a first data, which identifies each route type of the one or more route types, and a second data, which indicates one or more peering addresses of the first BGP host for each route type of the one or more route types.

In one feature of the aspect, the second message is received at the second BGP host. Based on the first information that is included in the second message, the second BGP host decides whether to exchange with the first BGP host a particular reachability information that is associated with a particular route type of the one or more route types. In response to deciding to exchange the particular reachability information with the first BGP host, the second BGP host establishes a BGP session to first BGP host in order to exchange the particular reachability information.

In a feature of this aspect, the steps of the method described herein are performed in a packet-switched network, where the network node is any one of a BGP route reflector and a route server.

In one feature of the aspect, the network node is a BGP route reflector. The first message is a first BGP UPDATE message that is received at the BGP route reflector over a first BGP session established between the BGP route reflector and the first BGP host. The second message is a second BGP UPDATE message that is sent from the BGP route reflector over a second BGP session established between the BGP route reflector and the second BGP host.

In one aspect, the present invention comprises a method for BGP service auto discovery. A first BGP message is received at a BGP route reflector from a first BGP peer. The first BGP peer belongs to a group of two or more BGP peers of the BGP route reflector, and the first BGP message comprises a first attribute that indicates that the first BGP peer can provide routes of one or more route types. A second BGP message is sent to a second BGP peer, where the second BGP message includes the first attribute.

In a feature of this aspect, the first attribute comprises, for each specific route type of the one or more route types, a first data which identifies that specific route type and a peering address designated at the first BGP peer for exchanging routes of that specific route type. In this feature, the method further comprises storing the first attribute at the BGP route reflector.

In one feature of the aspect, the second BGP message is received at the second BGP peer. Based on a particular first data that identifies a particular route type of the one or more route types, the second BGP peer decides whether to exchange with the first BGP peer routes of the particular route type. If the second BGP peer decides to exchange routes of the particular route type with the first BGP peer, then the second BGP peer establishes a BGP session to the first BGP peer at a particular peering address of the first BGP peer, where the particular peering address is designated at the first BGP peer for exchanging routes of the particular route type.

In a feature of this aspect, the first attribute further comprises, for each specific route type of the one or more route types, a second data indicating the type of a BGP session over which routes of that specific route type are exchanged. The first BGP message further comprises a second attribute that includes a group identifier that identifies the group of two or more BGP peers and a BGP identifier that identifies the first BGP peer. The BGP route reflector associates and stores the second attribute with the first attribute. In this feature, the first data may include an Address Family Identifier (AFI) value and a Subsequence Address Family Identifier (SAFI) value, where the AFI value and the SAFI value identify the first attribute as a BGP Auto Discovery attribute. The second attribute is included in a MP_REACH_NLRI attribute of the first BGP message, and may also include the AFI value and the SAFI value.

In this feature, the BGP route reflector may receive a third BGP message from the first BGP peer, where the third BGP message includes a third attribute indicating that the first BGP peer no longer provides routes of the one or more route types. Based on the third attribute, the first attribute and the second attribute are removed from the BGP route reflector. The BGP route reflector then sends a fourth message to the second BGP host, where the fourth message includes the third attribute. In this feature, the third attribute may include at least one of the group identifier of the group of two or more BGP peers and the BGP identifier of the first BGP peer. In order to remove the first and second attributes, the BGP route reflector may identify the first and second attributes based on at least one of the group identifier and the BGP identifier. In this feature, the third attribute may be included in a MP_UNREACH_NLRI attribute that is included in the third BGP message.

In one feature of the aspect, the first attribute may also include, for each specific route type of the one or more route types, a flag indicating for the specific route type whether any other BGP peer of the group of two or more BGP peers is allowed to establish a BGP session to the first BGP peer to exchange routes of the specific route type. The value stored in the flag may further indicate whether the first BGP peer is the route originator of routes having the specific route type and/or whether the first BGP peer is connected to the BGP route reflector over an external BGP (eBGP) session.

In a feature of this aspect, the first attribute may also include, for each specific route type of the one or more route types, a flag indicating for the specific route type whether any other BGP peer of the group of two or more BGP peers is forced to establish a new BGP session to the first BGP peer to exchange routes of the specific route type even though an old BGP session may exist to the first BGP peer for exchanging routes of the specific route type.

In one feature of the aspect, the first attribute may also include, for each specific route type of the one or more route types, a flag indicating that the first BGP peer will accept a BGP session from any other BGP peer of the group of two or more BGP peers in order to exchange routes of the specific route type.

In other aspects, the invention encompasses a computer apparatus and a computer-readable medium configured to carry out the foregoing steps.

2.0 Structural and Functional Overview

FIG. 1 is a block diagram that illustrates an overview of an example operational context in which an embodiment may be implemented. Autonomous System (AS) 100 includes Provider Edge (PE) routers 104, 106, and 108. Each of PE 104, 106, and 108 is BGP host that executes one or more BGP processes and performs the functions of an Autonomous System Border Router (ASBR) that exchanges routing information with ASBRs in other autonomous systems. As depicted in FIG. 1, PE 104, 106, and 108 are established on the edges of AS 100. The techniques for BGP service auto discovery described herein, however, are not limited to being implemented only in the context of provider edge routers. For example, any network element that executes a BGP process can implement the techniques described herein regardless of whether that network element is established within the network or on the edge of the network. Thus, the operational context depicted in FIG. 1 is to be regarded in an illustrative rather than a restrictive sense.

AS 100 also includes Route Reflector (RR) 102, which re-advertises, or reflects, routes to PE 104, 106, and 108. RR 102 operates according to the Route Reflection mechanism described in RFC2796, which was published by IETF in April 2000. According to RFC2796, a route reflector is BGP host that advertises to another BGP host routes learned through BGP. A route reflector may establish BGP sessions with one or more BGP peers, where each BGP session is configured for exchanging routes of one particular type, such as, for example, IPv4 unicast or IPv6 unicast routes. A route reflector must establish a different and separate BGP session with the same BGP peer for exchanging routes of different route types.

There are two types of BGP peers that may be associated with a route reflector: client peers, and non-client peers. A non-client BGP peer of the route reflector must be fully meshed, but a client BGP peer of the route reflector need not be fully meshed with the other client BGP peers of the route reflector. A route reflector along with its client BGP peers form a route reflection cluster. The route reflector may reflect routes among client BGP peers, among non-client BGP peers, or between client and non-client BGP peers. For example, when a route reflector learns a route from any of its BGP peers, it reflects the route in the following manner: if the route is learned from a non-client BGP peer then the route is reflected to all of the route reflector's client BGP peers; if the route is learned from a client BGP peer then the route is reflected to all of the route reflector's non-client BGP peers as well as to all of the route reflector's client BGP peers other than the client BGP peer from which the route was learned.

According to one embodiment of the techniques described herein, PE 104 establishes a BGP session 110 with RR 102 for the purpose of exchanging BGP service auto discovery information. For example, PE 104 may send to RR 102, over BGP session 110, configuration information about the types of routes supported by one or more BGP processes executing on PE 104. As referred to herein, a BGP host supports a particular route type if the BGP host maintains reachability information for routes of that particular route type and is capable of exchanging this reachability information with the one or more other BGP hosts. PE 104 may also receive from RR 102, over BGP session 110, configuration information about the types of routes supported by BGP processes executing on the other BGP peers of RR 102.

PE 106 and PE 108 establish with RR 102 BGP sessions 112 and 114, respectively. Similarly to BGP session 110, BGP sessions 112 and 114 are also BGP service auto discovery sessions, which are used for exchanging configuration information about different types of routes that are supported by the BGP peers of RR 102.

In operation, PE 104 sends over BGP session 110 a BGP message 116 that advertises to RR 102 configuration information about one or more route types supported by PE 104. For each particular route type advertised in BGP message 116, the configuration information includes parameters that may be needed by any BGP host to automatically establish a BGP session for exchanging with PE 104 routes of that particular route type.

When RR 102 receives BGP message 116, it registers the configuration information included in the message. RR 102 then sends the configuration information about the one or more route types advertised by PE 104 to its other BGP peers. For example, RR 102 sends BGP message 118A to PE 106 over BGP session 112, where BGP message 118A includes the configuration information advertised by PE 104. Similarly, RR 102 sends BGP message 118B to PE 108 over BGP session 114, where BGP message 118B includes the configuration information advertised by PE 104.

Upon receipt of BGP messages 118A and 118B, each of PE 106 and PE 108 may determine based on the information included in the messages whether to automatically establish a BGP session with PE 104 for the purpose of exchanging routes of a particular route type. For example, if PE 106 determines that it needs to exchange routes of a particular type with PE 104, PE 106 uses the information received in BGP message 118A to automatically create and send BGP message 120 to PE 104. BGP message 120 includes a request to PE 104 to establish a BGP session for exchanging routes of a particular route type that is advertised and supported by PE 104.

In this way, any BGP peer of RR 102 can configure a BGP session with PE 104 without the need for manual configuration by a network engineer. The techniques described herein may be implemented to automatically configure BGP sessions for exchanging routes of any route type. Furthermore, since the configuration information advertised by PE 104 can include parameters that are specific to each particular route type, BGP sessions may be automatically configured for any now known or later developed route types. The different route types may be identified by an AFI value, by a unique combination of AFI and SAFI values, or by any other parameter or parameters that can identify the type of a route, which route can be exchanged over a BGP session. Examples of different route types include, but are not limited to, IPv4 unicast, IPv6 unicast, IPv6 multicast, IPv6 unicast and multicast, IPX, Appletalk, Decnet IV, Banyan Vines, Domain Name System, XTP over IPv4, XTP over IPv6, and Fibre Channel World-Wide.

The techniques described herein may also be used as a mechanism to achieve a fine-tuned scaling of route reflectors. For example, the route reflectors in some large networks may become overloaded by just distributing routes. The techniques for BGP service auto discovery address this issue by providing the capability to off-load the distribution of routes of certain types from route reflectors by allowing the BGP hosts in the network to advertise auto discovery information and to determine for themselves whether to exchange routes with any other BGP hosts.

The techniques described herein are not limited to being implemented with respect to network elements that are established in a single network or autonomous system. For example, a route reflector may have a non-client BGP peer that is established in a different autonomous system. The route reflector may receive BGP auto discovery information from such a non-client BGP peer over an external BGP (eBGP) session, and may reflect this information to its client BGP peers. Similarly, the route reflector may receive BGP auto discovery information from a client BGP peer over an internal BGP (iBGP) session, and may reflect this information to its non-client BGP peers. In addition, the functionalities of the route reflector as described in the techniques herein may be performed by a route server that is configured for receiving and re-distributing BGP routes over any External or Internal Gateway protocol. For this reason, the operational context depicted in FIG. 1 is to be regarded in an illustrative rather than a restrictive sense with respect to the topology of the network elements on which embodiments of the techniques described herein may be implemented.

3.0 Method of BGP Service Auto Discovery

In one embodiment, the capability of a BGP host to advertise auto discovery information is associated with a combination of an AFI value and a SAFI value. In this embodiment, the AFI/SAFI combination is included in messages sent from a BGP host to a route reflector in order to signal to the route reflector that the BGP host is capable of advertising BGP auto discovery information. The AFI/SAFI combination is also used to identify messages in which BGP auto discovery information is being advertised.

For example, during the initial set up of a BGP session to a route reflector, a BGP host may include the BGP Auto Discovery AFI/SAFI combination in a BGP Capability parameter that is sent to the route reflector in a BGP OPEN message. Upon receiving and identifying the AFI/SAFI combination as a BGP Auto Discovery AFI/SAFI combination, the route reflector can determine that the BGP host is capable of advertising configuration information for the route types that the BGP host supports. Based on the BGP Auto Discovery AFI/SAFI combination, the route reflector may also determine that the BGP host is capable of receiving configuration information about route types supported by other BGP peers of the route reflector.

In this embodiment, a BGP host establishes a BGP session with a route reflector for the purpose of exchanging configuration information about route types supported by the BGP host or by other BGP peers of the route reflector. Once the BGP session is established, the BGP host sends to the route reflector a BGP UPDATE message. The BGP UPDATE message includes at least a MP_REACH_NLRI path attribute and a BGP Auto Discovery path attribute. The BGP Auto Discovery path attribute is a new path attribute that is defined according to the techniques described in this disclosure.

The MP_REACH_NLRI path attribute included in the BGP UPDATE message contains the AFI/SAFI combination that identifies the BGP Auto Discovery capability. The NLRI field of the MP_REACH_NLRI path attribute is formatted according to the techniques described herein and includes information that identifies at least the BGP host sending the auto discovery advertisement. The BGP Auto Discovery path attribute included in the BGP UPDATE message contains, for each route type supported by the BGP host, a Peering Descriptor. A Peering Descriptor for a particular route type is formatted according to the techniques described herein and includes the configuration parameters associated with that particular route type that are necessary for establishing a BGP session with the BGP host for the purpose of exchanging routes of that particular route type.

By using, in a BGP UPDATE message, a MP_REACH_NLRI path attribute that identifies the BGP Auto Discovery capability and a BGP Auto Discovery path attribute that contains the configuration parameters associated with one or more route types, the techniques described herein provide for advertising configuration information associated with one or more route types without the need to send a separate MP_REACH_NLRI path attribute in a separate BGP UPDATE message for each route type that is supported by the BGP host.

3.1 BGP Auto Discovery Path Attribute

One embodiment provides a new BGP path attribute, the BGP Auto Discovery path attribute. FIG. 3A is a block diagram that illustrates the format of the BGP Auto Discovery path attribute according to this embodiment.

Referring to FIG. 3A, a BGP Auto Discovery path attribute includes Attribute Flags field 302, Attribute Type Code field 304, Attribute Length field 306, and one or more Peering Descriptor fields, such as fields 308A, 308B, and 308N. In FIG. 3A, ellipsis 309 indicates that the format of the BGP Auto Discovery path attribute provides for an arbitrary number of Peering Descriptor fields.

In this embodiment, Attribute Flags field 302 is one octet in length and includes one or more bits that characterize the BGP Auto Discovery path attribute that is included in a BGP UPDATE message. For example, one bit in the Attribute Flags field 302 may be used to indicate whether the BGP Auto Discovery path attribute is optional, and another bit may be used to indicate whether the attribute is non-transitive.

Attribute Type Code field 304 is one octet in length and is used to store a value that may indicate whether the BGP Auto Discovery path attribute is well-known mandatory or well-know discretionary path attribute. The value stored in the Attribute Type Code field 304 is used by the different BGP implementations to determine whether the BGP Auto Discovery path attribute must be recognized and processed, or whether it can be silently discarded.

The Attribute Length field 306 stores the total length of the BGP Auto Discovery path attribute that is included in a BGP UPDATE message.

Peering Descriptor fields 308A to 308N store the configuration information for the route types supported by the BGP host that uses a BGP Auto Discovery path attribute for advertising the supported route types. Each Peering Descriptor field represents one particular route type of the one or more route types that are supported by the BGP host. In different embodiments, a Peering Descriptor field may store different parameters that comprise the configuration information depending on the particular route type that the Peering Descriptor represents. The format of a Peering Descriptor field according to one embodiment is presented in the section that follows.

3.2 BGP Auto Discovery Peering Descriptor

Figure 3B:
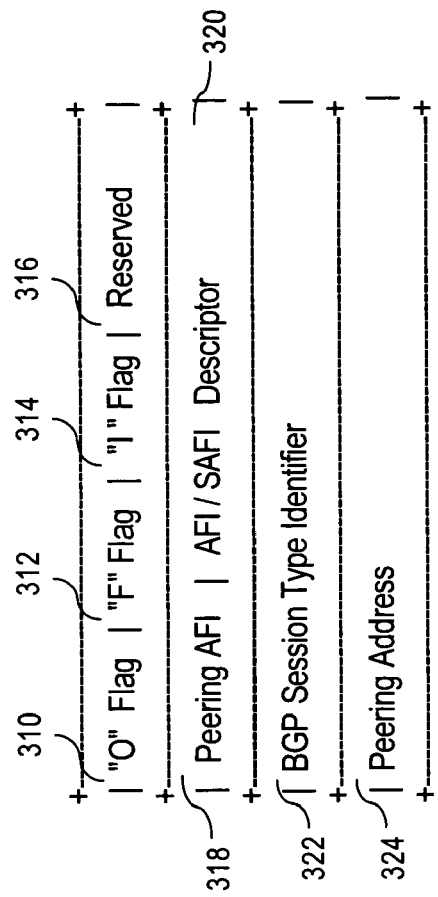
FIG. 3B is a block diagram that illustrates the format of a BGP Peering Descriptor field included in a BGP Auto Discovery path attribute according to one embodiment.
Figure 3A:
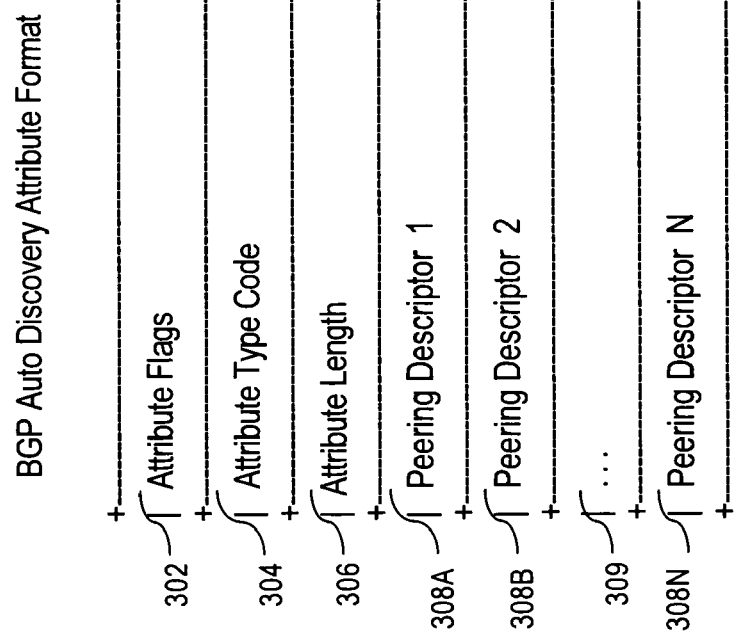
FIG. 3A is a block diagram that illustrates the format of a BGP Auto Discovery path attribute according to one embodiment.

FIG. 3B is a block diagram that illustrates the format of a BGP Peering Descriptor field included in a BGP Auto Discovery path attribute.

According to one embodiment, a BGP Peering Descriptor includes an "O" flag 310, an "F" flag 312, an "I" flag 314, a Peering AFI field 318, an AFI/SAFI Descriptor field 320, a BGP Session Type Identifier field 322, and a Peering Address field 324. In this embodiment, the BGP Peering Descriptor may also include a field that is reserved for future use, such as field 316.

"O" flag 310 is a bit flag that indicates whether the BGP host advertising the particular route type represented by the Peering Descriptor is the originator of routes of that particular route type. When set in a Peering Descriptor, the "O" flag indicates that the BGP host advertising the Peering Descriptor can set a BGP peering session with any BGP host that originates routes of the particular route type represented by the Peering Descriptor. A BGP host that originates routes may be, for example, a BGP process executing on an Autonomous System Border Router established in a different autonomous system. The BGP process may also be running an eBGP session to a route reflector that is established in the same or different autonomous system.

"F" flag 312 is a bit flag that indicates whether a BGP host, which wants to establish a BGP peering session for exchanging routes of the particular route type represented by the Peering Descriptor, must immediately establish a new BGP session for exchanging the routes. The "F" flag, when set in a Peering Descriptor, may also be used to force a BGP host to establish a new BGP peering session for exchanging routes of a particular route type, and to close any other BGP sessions that it may have open for exchanging routes of the particular route type.

"I" flag 314 is a bit flag that indicates whether the BGP host advertising the particular route type represented by the Peering Descriptor is advertising the route type for informational purposes only. When set in a Peering Descriptor, the "I" flag 314 may also indicate that any BGP host that receives the Peering Descriptor is not required to establish a BGP session for exchanging routes of the route type represented by the Peering Descriptor. When set, the "I" flag 314 may also indicate that the BGP host sending the Peering Descriptor will accept a BGP session from any BGP host that is interested in exchanging routes of the route type associated with the flag.

In a Peering Descriptor, the Peering AFI field 318 stores the AFI value associated with the type of the network address that is used to establish a BGP peering session. In some embodiments, the Peering AFI field 318 may store the AFI value associated with the address stored in the Peering Address field 324. For example, if the Peering AFI field 318 stores the value of "1", the field may indicate that the BGP session for exchanging routes should be established to an IPv4 address. If the Peering AFI field 318 stores the value of "2", the field may indicate that the BGP session for exchanging routes should be established to an IPv6 address.

In a Peering Descriptor, the AFI/SAFI Descriptor field 320 stores the AFI/SAFI combination that identifies the particular route type that is represented by the Peering Descriptor. In some embodiments, the AFI/SAFI Descriptor field 320 may contain a specially designated value, such as, for example, a value of zero. A special value may indicate to a BGP host receiving the Peering Descriptor that the Peering Address included in the Peering Descriptor applies for routes of any route type that the receiver BGP host wants to exchange. In these embodiments, the BGP host sending the Peering Descriptor and the BGP host receiving the Peering Descriptor may negotiate the route type of the routes to be exchanged during the set up of the BGP session. For example, the BGP host receiving the Peering Descriptor may include, in a Capability parameter of a BGP OPEN message sent to the BGP host that originated the Peering Descriptor, the AFI/SAFI combinations of the route types for which route exchange is requested.

In a Peering Descriptor, the BGP Session Type Identifier field 322 is used to store a value that indicates whether the BGP session for exchanging routes of the route type represented by the Peering Descriptor is to be established according to the Multi-Session BGP mechanism. Multi-Session BGP is a mechanism that is described in draft-ietf-idr-bgp-multisession-00.txt, which was published by IETF in May 2004. Multi-Session BGP allows for multiplexing different BGP sessions over the same Transport Control Protocol (TCP) connection. According to Multi-Session BGP, a BGP host may use the same IP address and TCP port number for establishing multiple BGP sessions each of which exchanges routes identified by different AFI/SAFI combinations.

According to the techniques described herein, a value of "0" stored in the BGP Session Type Identifier field 322 indicates that a "single" BGP session is to be established for exchanging routes of the particular route type represented by the Peering Descriptor that includes the BGP Session Type Identifier field 322. The "single" BGP session is to be established over a separate TCP connection. When the value of the BGP Session Type Identifier field 322 in a Peering Descriptor is non-zero, a BGP host receiving the Peering Descriptor would consider that the BGP session for exchanging routes of the particular route type should be established according to the Multi-Session BGP mechanism. In this case, the receiving BGP host would use the value stored in the BGP Session Type Identifier field to identify the BGP session it wants to establish from among other BGP sessions that may be established over the same TCP connection. For example, the BGP session may be identified by the triplet<AFI, SAFI, Session Identifier>, where the "Session Identifier" is the value stored in the BGP Session Type Identifier field 322 of a received Peering Descriptor.

Peering Address field 324 is used for storing the network address that the BGP host advertising the Peering Descriptor has designated for exchanging routes of the particular route type represented by the Peering Descriptor. For example, in a TCP/IP network, the Peering Address field 324 may store the IP address and the TCP port number at which the BGP host is ready to establish a BGP session for exchanging routes of the particular route type.

3.3 BGP Auto Discovery NLRI

In one embodiment, a new Network Layer Reachability Information (NLRI) format is defined for NLRI fields that are associated with the BGP Auto Discovery Capability. The BGP Auto Discovery NLRI field may be included in a MP_REACH_NLRI path attribute that is included (along with a BGP Auto Discovery path attribute) in a BGP UPDATE message that advertises the route types supported by a BGP host. The BGP Auto Discovery NLRI field may also be included in a MP_UNREACH_NLRI path attribute that is included in BGP UPDATE message for the purpose of withdrawing previously advertised configuration information for one or more route types.

Figure 3D:
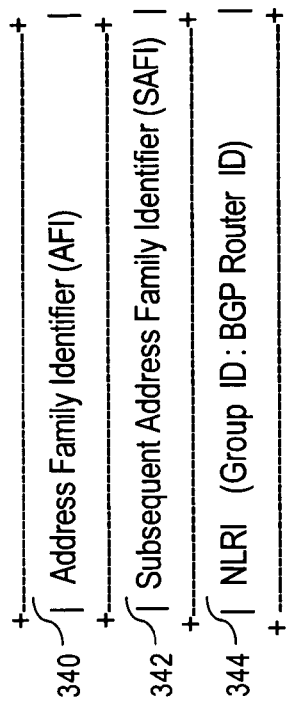
FIG. 3D is a block diagram that illustrates the format of a MP_UNREACH_NLRI path attribute that is used in BGP service auto discovery according to one embodiment.
Figure 3C:
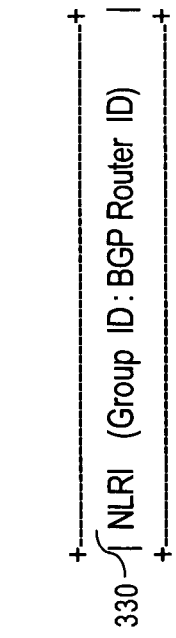
FIG. 3C is a block diagram that illustrates the format of a NLRI field included in a MP_REACH_NLRI path attribute that is used in BGP service auto discovery according to one embodiment.

FIG. 3C is a block diagram that illustrates the format of a NLRI field included in a MP_REACH_NLRI path attribute that is used in BGP service auto discovery according to one embodiment. The NLRI field 330 comprises a Group ID value and a BGP Router ID value.

The Group ID value identifies a group of BGP hosts to which a route reflector should re-advertise a BGP message that includes BGP auto discovery information. To illustrate the use of the Group ID value, suppose that a route reflector receives a BGP UPDATE message that advertises the route types supported by the sender BGP host. The BGP UPDATE message includes, in a BGP Auto Discovery path attribute, configuration information for the route types that the BGP host supports. The BGP UPDATE message also includes a MP_REACH_NLRI path attribute, which attribute in turn includes a NLRI field 330 that carries a Group ID value. The route reflector extracts the Group ID value from the NLRI field, and based on the value determines to which of its BGP peers its should re-advertise the BGP auto discovery information. If the Group ID value in NLRI field 330 is blank or is not specified, the route reflector would re-advertise the BGP auto discovery information to all of its BGP peers (which may be client peers or non-client peers). If the value of the Group ID in NLRI field 330 is specified, then the route reflector would re-advertise the BGP auto discovery information to the group of BGP peers identified by the Group ID value.

The Group ID value in NLRI field 330 may identify a group of BGP peers of the route reflector, which group may be an entire set of client BGP peers of the route reflector. The value of the Group ID may also identify a group of two or more BGP peers that is a subset of one or more sets of client and/or non-client BGP peers of the route reflector. In general, the role of the Group ID value in NLRI field 330 is to allow for a finer granularity in the distribution of BGP auto discovery information.

The BGP Router ID value included in NLRI field 330 identifies the BGP host that sends the BGP auto discovery information. When a BGP host changes its BGP Router ID, all BGP sessions of the BGP host need to be restarted, and the information previously identified by the old BGP Router ED must be withdrawn.

In some embodiments, for the purposes of identifying itself to a route reflector, a BGP host is allowed to have only one BGP Router ID. In these embodiments, the route reflector needs to keep track of the values of a single BGP Auto Discovery NLRI field for the BGP host. In other embodiments, a BGP host may execute a plurality of BGP processes, each of which is identified to the route reflector with a separate and different BGP Router ID. In these embodiments, the route reflector needs to keep track of the values of multiple NLRI fields for the BGP host. When the router reflector re-advertises the BGP auto discovery information received from the BGP host, the route reflector may build an aggregate NLRI field for the BGP host based on the BGP Router IDs of the BGP processes executing on the BGP host. For example, the route reflector may create a composite NLRI field which includes a list of <Group ID, BGP Router ID> tuples, where the NLRI field includes a separate tuple for each BGP Router ID of the BGP host.

FIG. 3D is a block diagram that illustrates the format of a MP_UNREACH_NLRI path attribute that is used to withdraw previously advertised BGP service auto discovery information. The MP_UNREACH_NLRI path attribute is usually stored in a BGP UPDATE message, and includes AFI field 340, SAFI field 342, and NLRI field 344.

AFI field 340 and SAFI field 342 are used to store the AFI and SAFI values, respectively, of the AFI/SAFI combination that identifies the BGP Auto Discovery capability. NLRI field 344 has the same format as NLRI field 330 in FIG. 3C, and includes a Group ID and a BGP Router ID.

In operation, when a BGP host wants to withdraw previously advertised configuration information about one or more route types, the BGP host creates a MP_UNREACH_NLRI path attribute that includes the combination of AFI/SAFI values for the BGP Auto Discovery capability. In the NLRI field of the MP_UNREACH_NLRI path attribute, the BGP host includes the same Group ID and BGP Router ID that were used previously in the NLRI field of a MP_REACH_NLRI path attribute to advertise the configuration information. The BGP host includes the MP_UNREACH_NLRI path attribute in a BGP UPDATE message that is sent to the route reflector. The route reflector receives the BGP UPDATE message, and extracts the Group ID and the BGP Router ID from the MP_UNREACH_NLRI path attribute. The route reflector then matches the Group ID and/or the BGP Router ID to GroupIDs and BGP Router IDs associated with any previously received configuration information that is stored at the route reflector. The route reflector then removes any previously received configuration information for which a match is found, and re-advertises the MP_UNREACH_NLRI path attribute in BGP UPDATE messages to the BGP peers of the route reflector that previously received the matched configuration information.

3.4 An Example Embodiment of a Method of BGP Auto Discovery

In one embodiment, the techniques described herein may be illustrated in the operational context depicted in FIG. 1. Referring to FIG. 1, PE 104 establishes BGP session 110 with RR 102, PE 106 establishes BGP session 112 with RR 102, and PE and 108 establishes BGP session 114 with RR 102. BGP sessions 110, 112, and 114 are established for the purpose of exchanging configuration information about one or more route types that are supported at any BGP peer of RR 102.

In some embodiments, the initial set up of the BGP sessions may be performed manually, or may be based on one or more template configuration files that are provisioned to BGP hosts that establish the sessions. Any groups of BGP hosts may be defined and configured at the route reflector, and each BGP host may be manually or automatically provisioned with the Group IDs of the groups in which the BGP host participates. In addition, the techniques described herein for BGP Auto Discovery may be utilized in conjunction with mechanisms that allow the route reflector to configure and recognize ranges of BGP hosts. In this way, the route reflector may automatically add and/or delete BGP hosts to and/or from previously defined groups.

Once BGP sessions 110, 112, and 114 have been established, each of PE 104, 106, and 108 may register with RR 102 configuration information about the one or more route types supported by that PE network element. RR 102 may then re-advertise, or reflect, this configuration information to the other PE network elements. For illustration purposes, in FIG. 1 PE 104 advertises the configuration information about the one or more route types that it supports, and PE 106 and PE 108 receive this information as reflected by RR 102. However, the techniques described herein are not limited to allowing only any specific network element to advertise its BGP auto discovery information, and any BGP peer of a route reflector may both send to, and receive from, the route reflector configuration information for one or more route types supported by any BGP peer of the route reflector.

Figure 2A:
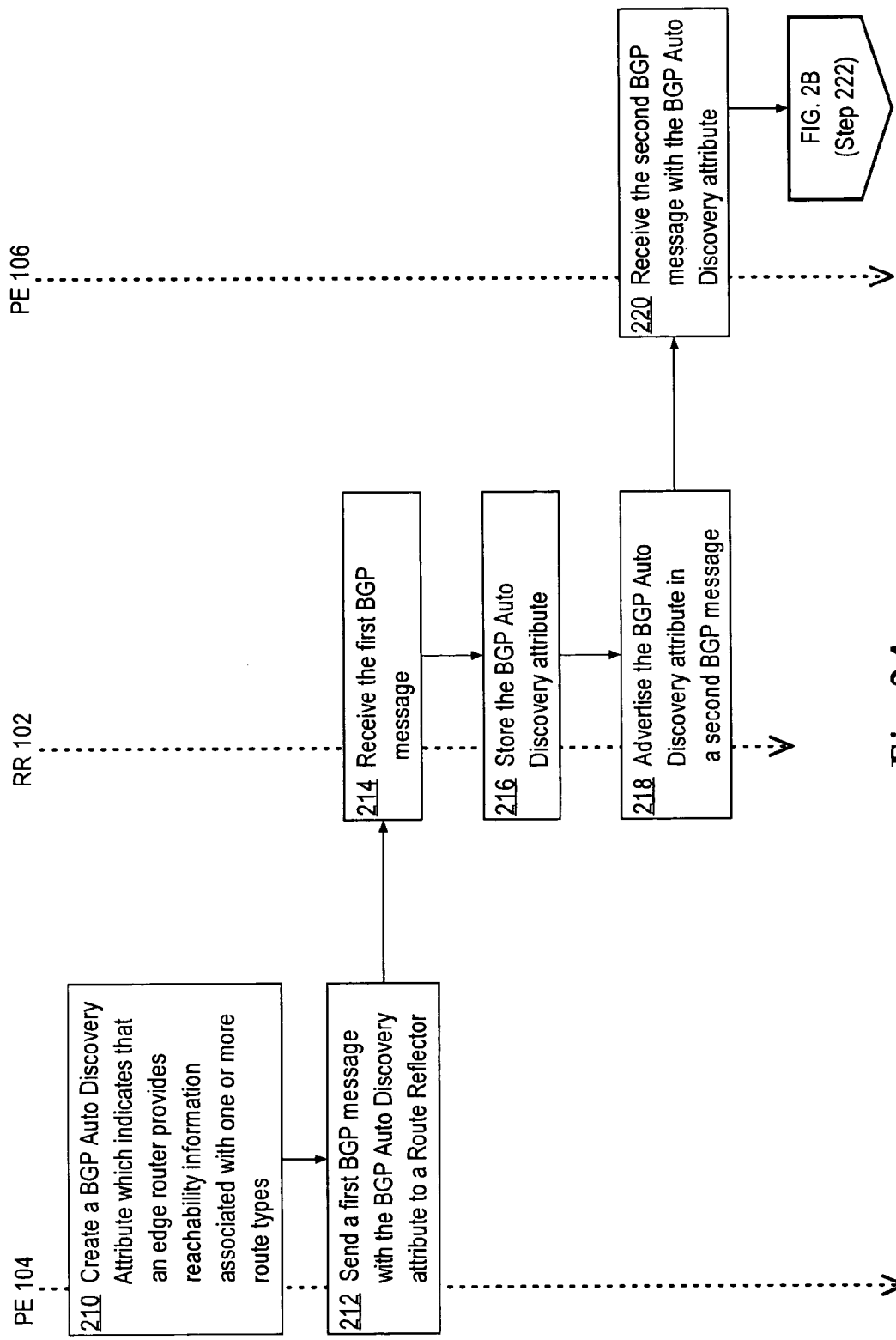
FIG. 2A is a flow diagram that illustrates a high level overview of one embodiment of a method for BGP service auto discovery.
Figure 2B:
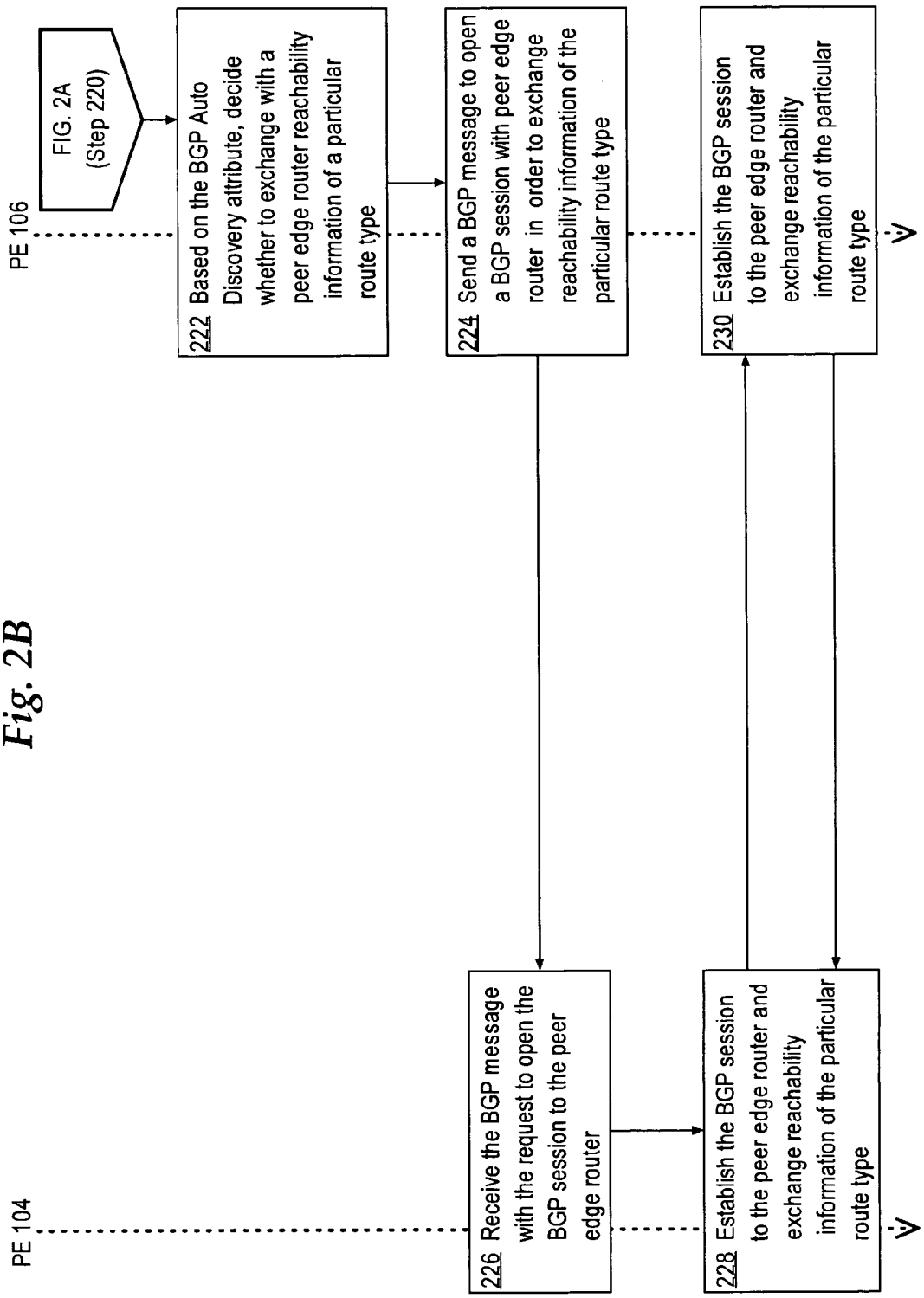
FIG. 2B is a continuation of the flow diagram depicted in FIG. 2A.

FIG. 2A and FIG. 2B are flow diagrams that illustrate a high level overview of an example embodiment of a method for BGP service auto discovery. For purposes of illustrating a clear example, the flow diagrams of FIG. 2A and FIG. 2B are presented with reference to the structural elements depicted in FIG. 1, but the broad techniques described herein are not limited to the context of FIG. 1 and may be used in many other network contexts.

Referring to FIG. 2A, in step 210 an edge router such as PE 104 creates a BGP Auto Discovery path attribute that indicates that the edge router PE 104 provides reachability information associated with one or more route types. For each of the route types that PE 104 supports, the BGP Auto Discovery attribute includes a Peering Descriptor that represents that route type. Each Peering Descriptor includes the configuration parameters that are needed by a BGP host to establish a BGP session with PE 104 for exchanging routes having the particular route type represented by the Peering Descriptor.

In step 212, PE 104 sends a first BGP message to a route reflector such as RR 102 over BGP session 110. The first BGP message includes the BGP Auto Discovery path attribute created in step 210, and also may include a MP_REACH_NLRI path attribute. The MP_REACH_NLRI path attribute includes the combination of AFI/SAFI values that identifies a BGP Auto Discovery capability. The MP_REACH_NLRI path attribute also includes a NLRI field that contains a Group ID value and a BGP Router ID value, where the Group ID value signals to RR 102 the group of BGP peers to which the information in the BGP Auto Discovery path attribute may be reflected and the BGP Router ID value identifies PE 104 as the originator of the BGP Auto Discovery path attribute.

In step 214, RR 102 receives the first BGP message from PE104. RR 102 unpacks the first BGP message and retrieves the information included in the MP_REACH_NLRI and BGP Auto Discovery path attributes. In step 216, RR 102 stores the information included in the BGP Auto Discovery path attribute. In some embodiments, a route reflector maintains a database of configuration information associated with the route types supported by each of the BGP peers of the route reflector. The database of configuration information may be stored in permanent store, or may be cached in volatile memory. In other embodiments, the route reflector may only reflect the advertised configuration information without making any record of it.

In step 218, RR 102 advertises the BGP Auto Discovery path attribute that it has received from PE 104 in a second BGP message, which is sent over BGP session 112 to a peer edge router such as PE 106. The second BGP message may also include a MP_REACH_NLRI path attribute with a NLRI field that stores the Group ID and the BGP Router ID of PE 104. RR 102 then sends the second BGP message to its BGP peers. In some embodiments, a route reflector may determine the recipients of the second BGP message based on the value of the Group ID received from PE 104. In other embodiments, the route reflector sends the second BGP message to all of its BGP peers.

In step 220, PE 106 receives the second BGP message and unpacks the BGP Auto Discovery path attribute included in the message.

Referring to FIG. 2B, in step 222 PE 106 decides whether to exchange with a peer edge router such as PE 104 reachability information for routes of a particular route type that is supported by PE 104. PE 106 examines each Peering Descriptor included in the BGP Auto Discovery path attribute, and based on the value of the AFI/SAFI Descriptor field included in the Peering Descriptor determines the particular route type supported by PE 102.

For each route type that is advertised in the received BGP Auto Discovery path attribute and in which PE 106 is interested, in step 224 PE 106 sends a BGP message to PE 104 requesting the establishment of a BGP session for exchanging routes of that particular route type. The BGP message is usually a BGP OPEN message that is sent to the Peering Address included in the Peering Descriptor that represents the particular route type in the received BGP Auto Discovery path attribute.

In step 226, PE 104 receives the BGP message with the request to open a BGP session to a peer edge router such as PE 106 for exchanging routes of a route type defined by a combination of AFI/SAFI values selected by PE 106 in step 222. In step 228, PE 104 proceeds through the normal BGP session set up mechanism to establish a BGP session to PE 106. Similarly, PE 106 proceeds in step 230 to establish the BGP session with PE 104 for exchanging routes having a route type defined by the AFI/SAFI combination selected by PE 106.

4.0 Implementation Mechanisms—Hardware Overview

Figure 4:
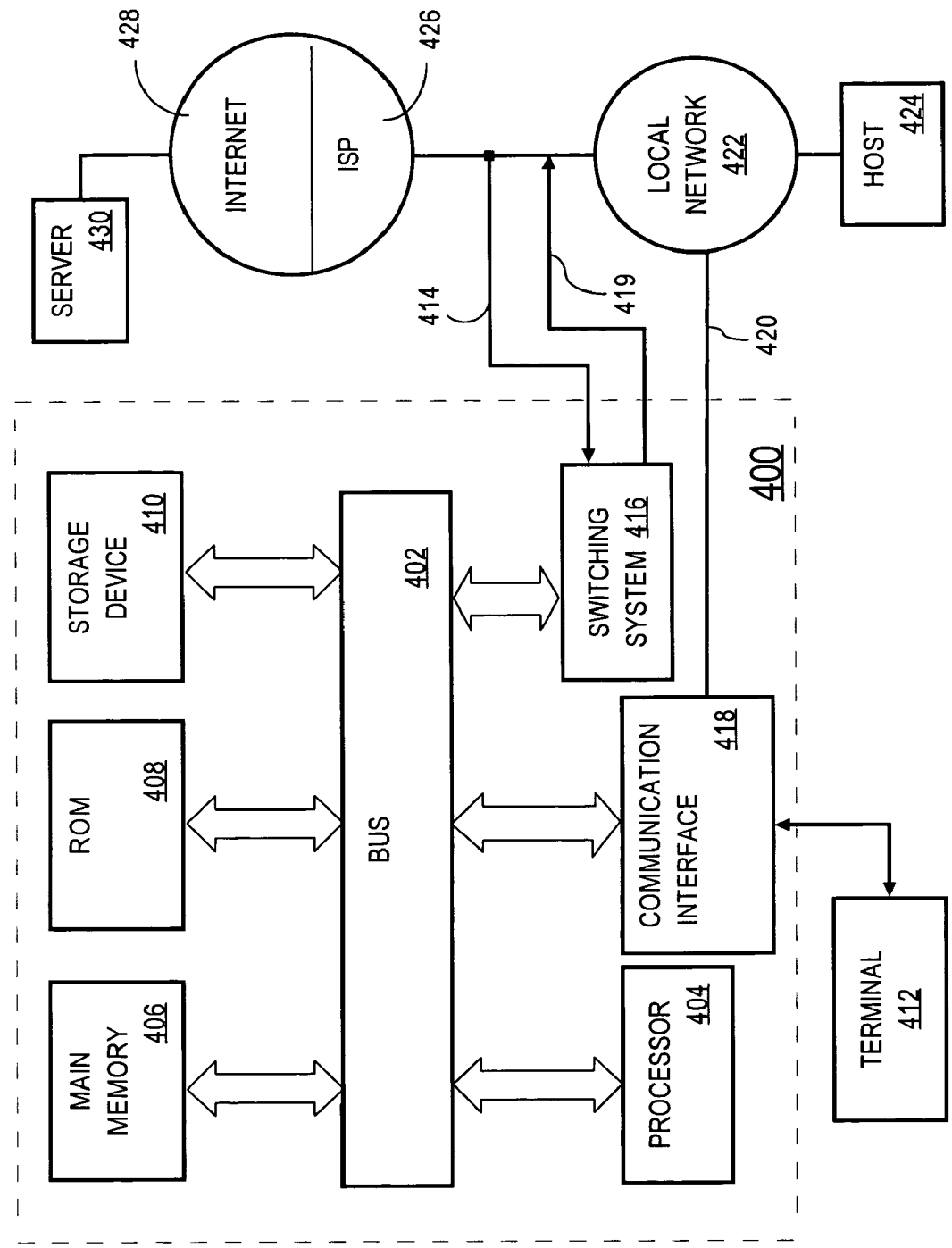
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for BGP service auto discovery. According to one embodiment of the invention, BGP service auto discovery is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for BGP service auto discovery as described herein.

The received code may be executed by processor 404 as it is received, and/or stored in storage device 410, or other non-volatile storage for later execution.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of Border Gateway Protocol (BGP) service auto discovery, the method comprising the computer-implemented steps of:
    receiving, at a network node, a first message from a first BGP host, wherein the first message comprises first information that indicates that the first BGP host provides reachability information associated with one or more route types;
    wherein the first information comprises:
        first data that identifies the one or more route types; and
        second data that indicates one or more peering addresses, of the first BGP host, that are designated for one or more BGP peering sessions to the first BGP host for exchanging routes of the one or more route types;
    storing the first information at the network node; and
    sending the first information in a second message from the network node to a second BGP host, wherein the first BGP host and the second BGP host are not conducting a BGP peering session;
    wherein the first information in the second message is configured to cause the second BGP host to determine whether to establish the one or more BGP peering sessions with the first BGP host in order to exchange the routes of the one or more route types;
    wherein the steps of the method are performed by one or more network elements.

2. A method as recited in claim 1, further comprising:
    receiving the second message at the second BGP host; and
    based on the first information that is included in the second message, the second BGP host performing the steps of:
        deciding whether to exchange with the first BGP host a particular reachability information that is associated with a particular route type of the one or more route types; and
        in response to deciding to exchange the particular reachability information with the first BGP host, establishing a BGP session to the first BGP host in order to exchange the particular reachability information.

3. A method as recited in claim 2, wherein the steps are performed in a packet-switched network, wherein the network node is any of a BGP route reflector and a route server.

4. A method as recited in claim 1, wherein:
    the network node is a BGP route reflector;
    the first message is a first BGP UPDATE message that is received at the BGP route reflector over a first BGP session established between the BGP route reflector and the first BGP host; and
    the second message is a second BGP UPDATE message that is sent from the BGP route reflector over a second BGP session established between the BGP route reflector and the second BGP host.

5. A method of Border Gateway Protocol (BGP) service auto discovery, the method comprising the computer-implemented steps of:
    at a BGP route reflector, receiving a first BGP message from a first BGP peer,
    wherein:
        the first BGP peer belongs to a group of two or more BGP peers of the BGP route reflector;
        the first BGP message comprises a first attribute which indicates that the first BGP peer can provide routes of one or more route types;
        the first attribute comprises, for each specific route type of the one or more route types:
            a first data which identifies that specific route type, and
            a peering address designated at the first BGP peer for exchanging routes of that specific route type; and
    sending a second BGP message to a second BGP peer of the group of two or more BGP peers, wherein the second BGP message includes the first attribute;
    wherein the first BGP peer and the second BGP peer are not conducting any BGP peering sessions for exchanging the routes of the one or more route types;
    wherein the first attribute in the second BGP message is configured to cause the second BGP peer to determine whether to establish one or more BGP peering sessions with the first BGP peer in order to exchange the routes of the one or more route types;
    wherein the steps of the method are performed by one or more network elements.

6. A method as recited in claim 5, further comprising storing the first attribute at the BGP route reflector.

7. A method as recited in claim 6, further comprising:
    receiving the second BGP message at the second BGP peer;
    based on a particular first data that identifies a particular route type of the one or more route types, deciding at the second BGP peer whether to exchange with the first BGP peer routes of the particular route type; and
    if it is decided at the second BGP peer to exchange routes of the particular route type with the first BGP peer, establishing a BGP session to the first BGP peer at a particular peering address of the first BGP peer, wherein the particular peering address is designated at the first BGP peer for exchanging routes of the particular route type.

8. A method as recited in claim 6, wherein:
    the first attribute further comprises, for each specific route type of the one or more route types, a second data indicating the type of a BGP session over which routes of that specific route type are exchanged;
    the first BGP message further comprises a second attribute, wherein the second attribute includes:
        a group identifier that identifies the group of two or more BGP peers; and
        a BGP identifier that identifies the first BGP peer; and
    the step of storing the first attribute at the BGP route reflector further comprises storing the second attribute at the BGP route reflector, wherein the first attribute is associated with the second attribute.

9. A method as recited in claim 8, wherein:
    the first data includes an Address Family Identifier (AFI) value and a Subsequence Address Family Identifier (SAFI) value, wherein the AFI value and the SAFI value identify the first attribute as a BGP Auto Discovery attribute; and the second attribute includes the AFI value and the SAFI value, wherein the second attribute is included in a MP_REACH_NLRI attribute of the first BGP message.

10. A method as recited in claim 8, further comprising:

at the BGP route reflector, receiving a third BGP message from the first BGP peer, wherein the third BGP message includes a third attribute indicating that the first BGP peer no longer provides routes of the one or more route types;

based on the third attribute, removing the first attribute and the second attribute stored at the BGP route reflector; and sending a fourth BGP message to the second BGP peer, wherein the fourth BGP message includes the third attribute.

11. A method as recited in claim 10, wherein:

the third attribute includes at least one of the group identifier of the group of two or more BGP peers and the BGP identifier of the first BGP peer; and the step of removing the first attribute and the second attribute stored at the BGP route reflector further comprises identifying the first attribute and the second attribute based on at least one of the group identifier and the BGP identifier.

12. A method as recited in claim 10, wherein the third attribute is included in a MP_UNREACH_NLRI attribute that is included in the third BGP message.

13. A method as recited in claim 5, wherein the first attribute further comprises, for each specific route type of the one or more route types, a flag indicating for the specific route type whether any other BGP peer of the group of two or more BGP peers is allowed to establish a BGP session to the first BGP peer to exchange routes of the specific route type.

14. A method as recited in claim 13, wherein the value stored in the flag further indicates at least one of:

whether the first BGP peer is the route originator of routes having the specific route type; and whether the first BGP peer is connected to the BGP route reflector over an external BGP (eBGP) session.

15. A method as recited in claim 5, wherein the first attribute further comprises, for each specific route type of the one or more route types, a flag indicating for the specific route type whether any other BGP peer of the group of two or more BGP peers is forced to establish a new BGP session to the first BGP peer to exchange routes of the specific route type even though an old BGP session exists to the first BGP peer for exchanging routes of the specific route type.

16. A method as recited in claim 5, wherein the first attribute further comprises, for each specific route type of the one or more route types, a flag indicating that the first BGP peer will accept a BGP session from any other BGP peer of the group of two or more BGP peers in order to exchange routes of the specific route type.

17. An apparatus for Border Gateway Protocol (BGP) service auto discovery, comprising:

means for receiving a first message from a first BGP host, wherein the first message comprises first information which indicates that the first BGP host provides reachability information associated with one or more route types;

wherein the first information comprises:

first data that identifies the one or more route types; and second data that indicates one or more peering addresses, of the first BGP host, that are designated for one or more BGP peering sessions to the first BGP host for exchanging routes of the one or more route types;

means for storing the first information; and means for sending the first information in a second message to a second BGP host, wherein the first BGP host and the second BGP host are not conducting a BGP peering session;

wherein the first information in the second message is configured to cause the second BGP host to determine whether to establish the one or more BGP peering sessions with the first BGP host in order to exchange the routes of the one or more route types.

18. The apparatus of claim 17, wherein the apparatus is established in a packet-switched network, and wherein the apparatus executes any of a BGP route reflector and a route server.

19. The apparatus of claim 17, wherein:

the apparatus executes a BGP route reflector;

the first message is a first BGP UPDATE message that is received at the BGP route reflector over a first BGP session established between the BGP route reflector and the first BGP host; and the second message is a second BGP UPDATE message that is sent from the BGP route reflector over a second BGP session established between the BGP route reflector and the second BGP host.

20. An apparatus for Border Gateway Protocol (BGP) service auto discovery, comprising:

one or more processors;

one or more stored sequences of instructions which, when executed by the one or more processors, cause the one or more processors to perform the steps of:

executing a BGP route reflector;

receiving a first BGP message from a first BGP peer, wherein:

the first BGP peer belongs to a group of two or more BGP peers of the BGP route reflector;

the first BGP message comprises a first attribute which indicates that the first BGP peer can provide routes of one or more route types;

the first attribute comprises, for each specific route type of the one or more route types:

a first data which identifies that specific route type, and a peering address designated at the first BGP peer for exchanging routes of that specific route type; and sending a second BGP message to a second BGP peer of the group of two or more BGP peers, wherein the second BGP message includes the first attribute;

wherein the first BGP peer and the second BGP peer are not conducting any BGP peering sessions for exchanging the routes of the one or more route types;

wherein the first attribute in the second BGP message is configured to cause the second BGP peer to determine whether to establish one or more BGP peering sessions with the first BGP peer in order to exchange the routes of the one or more route types.

21. The apparatus of claim 20, wherein the one or more stored sequences of instructions further comprise instructions which, when executed by the one or more processors, cause the one or more processors to perform the step of storing the first attribute at the BGP route reflector.

22. The apparatus of claim 21, wherein:

the first attribute further comprises, for each specific route type of the one or more route types, a second data indicating the type of a BGP session over which routes of that specific route type are exchanged;

the first BGP message further comprises a second attribute, wherein the second attribute includes:
   a group identifier that identifies the group of two or more BGP peers; and
   a BGP identifier that identifies the first BGP peer; and the step of storing the first attribute at the BGP route reflector further comprises storing the second attribute at the BGP route reflector, wherein the first attribute is associated with the second attribute.

23. The apparatus of claim 22, wherein:
the first data includes an Address Family Identifier (AFI) value and a Subsequence Address Family Identifier (SAFI) value, wherein the AFI value and the SAFI value identify the first attribute as a BGP Auto Discovery attribute; and
the second attribute includes the AFI value and the SAFI value, wherein the second attribute is included in a MP_REACH_NLRI attribute of the first BGP message.

24. The apparatus of claim 22, wherein the instructions further cause the one or more processors to perform the steps of:
   at the BGP route reflector, receiving a third BGP message from the first BGP peer, wherein the third BGP message includes a third attribute indicating that the first BGP peer no longer provides routes of the one or more route types;
   based on the third attribute, removing the first attribute and the second attribute stored at the BGP route reflector; and
   sending a fourth BGP message to the second BGP peer, wherein the fourth BGP message includes the third attribute.

25. The apparatus of claim 24, wherein:
the third attribute includes at least one of the group identifier of the group of two or more BGP peers and the BGP identifier of the first BGP peer; and
the step of removing the first attribute and the second attribute stored at the BGP route reflector further comprises identifying the first attribute and the second attribute based on at least one of the group identifier and the BGP identifier.

26. The apparatus of claim 24, wherein the third attribute is included in a MP_UNREACH_NLRI attribute that is included in the third BGP message.

27. The apparatus of claim 20, wherein the first attribute further comprises, for each specific route type of the one or more route types, a flag indicating for the specific route type whether any other BGP peer of the group of two or more BGP peers is allowed to establish a BGP session to the first BGP peer to exchange routes of the specific route type.

28. The apparatus of claim 27, wherein the value stored in the flag further indicates at least one of:
   whether the first BGP peer is the route originator of routes having the specific route type; and
   whether the first BGP peer is connected to the BGP route reflector over an external BGP (eBGP) session.

29. The apparatus of claim 20, wherein the first attribute further comprises, for each specific route type of the one or more route types, a flag indicating for the specific route type whether any other BGP peer of the group of two or more BGP peers is forced to establish a new BGP session to the first BGP peer to exchange routes of the specific route type even though an old BGP session exists to the first BGP peer for exchanging routes of the specific route type.

30. The apparatus of claim 20, wherein the first attribute further comprises, for each specific route type of the one or more route types, a flag indicating that the first BGP peer will accept a BGP session from any other BGP peer of the group of two or more BGP peers in order to exchange routes of the specific route type.

31. A computer-readable volatile or non-volatile medium storing one or more sequences of instructions for Border Gateway Protocol (BGP) service auto discovery, which instructions, when executed by one or more processors, cause the one or more processors to perform the steps of:
   receiving a first message from a first BGP host, wherein the first message comprises first information that indicates that the first BGP host provides reachability information associated with one or more route types;
   wherein the first information comprises:
      first data that identifies the one or more route types; and
      second data that indicates one or more peering addresses, of the first BGP host, that are designated for one or more BGP peering sessions to the first BGP host for exchanging routes of the one or more route types;
   storing the first information; and
   sending the first information in a second message to a second BGP host, wherein the first BGP host and the second BGP host are not conducting a BGP peering session;
   wherein the first information in the second message is configured to cause the second BGP host to determine whether to establish the one or more BGP peering sessions with the first BGP host in order to exchange the routes of the one or more route types.

32. A computer-readable volatile or non-volatile medium storing one or more sequences of instructions for Border Gateway Protocol (BGP) service auto discovery, which instructions, when executed by one or more processors, cause the one or more processors to perform the steps of:
   executing a BGP route reflector;
   at the BGP route reflector, receiving a first BGP message from a first BGP peer,
   wherein:
      the first BGP peer belongs to a group of two or more BGP peers of the BGP route reflector;
      the first BGP message comprises a first attribute which indicates that the first BGP peer can provide routes of one or more route types;
      the first attribute comprises, for each specific route type of the one or more route types:
         a first data which identifies that specific route type, and
         a peering address designated at the first BGP peer for exchanging routes of that specific route type; and
   sending a second BGP message to a second BGP peer of the group of two or more BGP peers, wherein the second BGP message includes the first attribute;
   wherein the first BGP peer and the second BGP peer are not conducting any BGP peering sessions for exchanging the routes of the one or more route types;
   wherein the first attribute in the second BGP message is configured to cause the second BGP peer to determine whether to establish one or more BGP peering sessions with the first BGP peer in order to exchange the routes of the one or more route types.

\* \* \* \* \*